D. A. SCHUTT.
GRAIN DRILL.
APPLICATION FILED DEC. 12, 1910.
1,026,410.
Patented May 14, 1912.
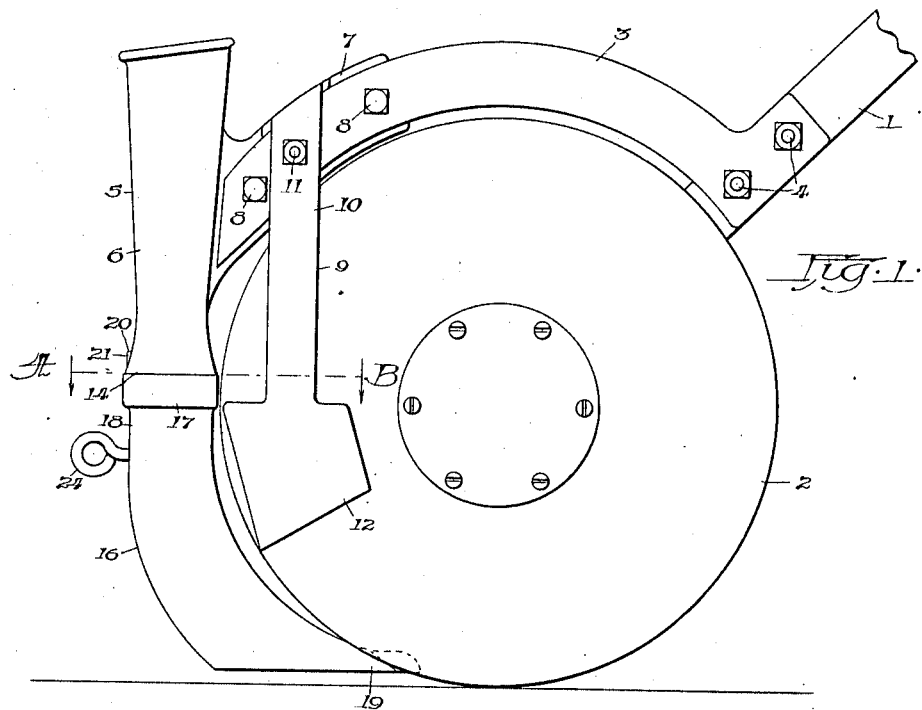
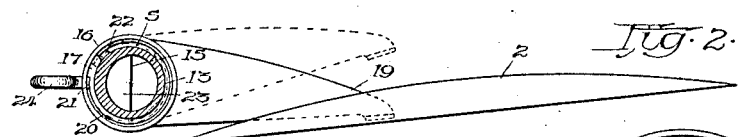
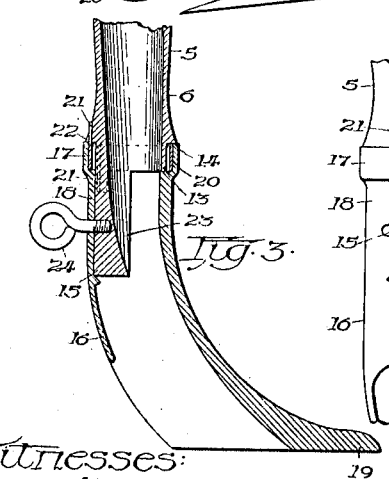
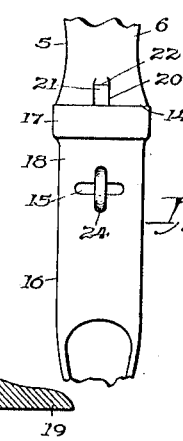
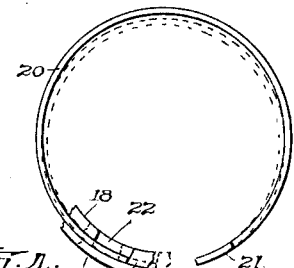
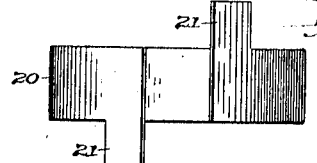
Witnesses:
F. W. Hoffmeister
W. H. ...
Inventor:
Duny A. Schutt
By E. W. Burgess
Attorney

UNITED STATES PATENT OFFICE.

DUNY A. SCHUTT, OF CHICAGO, ILLINOIS, ASSIGNOR TO INTERNATIONAL HARVESTER COMPANY, A CORPORATION OF NEW JERSEY.

GRAIN-DRILL.

1,026,410.

Specification of Letters Patent.  Patented May 14, 1912.

Application filed December 12, 1910. Serial No. 596,987.

*To all whom it may concern:*

Be it known that I, DUNY A. SCHUTT, a citizen of the United States, residing at Chicago, in the county of Cook and State of Illinois, have invented certain new and useful Improvements in Grain-Drills, of which the following is a specification.

My invention relates to grain drills, and to the type of machine in that general class having furrow opening disks in its specific embodiment, and the construction of the seed conducting boot or conduit that coöperates with the disk in the proper distribution of the seed; the object of my invention being to provide the boot with a yielding member about its delivery end, the toe of which is spring-pressed against the surface of the disk in a manner to prevent any accumulation of trash between the toe and disk. I attain this object by means of the mechanism illustrated in the accompanying drawing, in which—

Figure 1 represents a side elevation of a disk furrow opener having my improved grain conduit forming a part thereof; Fig. 2 represents a longitudinal section of part of Fig. 1 along line A—B; Fig. 3 is a vertical section of the lower end of the conduit, illustrating the manner of connecting the movable member with the fixed member; Fig. 4 is a rear view of part of the conduit; Fig. 5 is a detail showing a top plan view of the connecting means between the two members of the conduit; and Fig. 6 is a side elevation of Fig. 5.

The same reference characters designate like parts throughout the several views.

1 represents a drag bar having a furrow opening disk 2 suitably journaled upon its lower end, 3 a curved arm having its forward end secured to the drag bar by means of bolts 4, and its body portion curved in a rearward direction above the disk and substantially concentric with the axis thereof.

5 represents the grain boot comprising two parts, an upper part 6 having a forwardly and upwardly curved arm 7, to which is secured the rear end of arm 3 by means of bolts 8, and 9 represents a plate spring scraper having its upper shank portion 10 secured to arms 7 and 3 by means of a bolt 11, and its lower scraper portion 12 contacting with the concave surface of the disk in a manner to prevent an accumulation of soil thereon. The lower end of the upper part of the grain boot is provided with a circumferential bearing portion 13, having a shoulder 14 at its upper end, and a depending shank portion 15 at its rear side, having its outer surface concentric with said bearing and forming a continuation of approximately half of the same in a downward direction.

16 represents the lower part of the boot, having a socket portion 17 at its upper end that receives the bearing portion 13 of the upper member, and a bearing portion 18 that receives the shank, and curving forward and downward is provided with a toe portion 19 that is adapted to contact with the convex surface of the disk near its outer edge. The socket 17 has a greater diameter than the bearing 13, and 20 represents a spring member coiled in a manner to be received between the inner wall of the socket and the bearing and provided with oppositely disposed tang portions 21 that are received by longitudinally arranged openings 22 in the two members of the boot whereby the resiliency of the spring is operative to turn the toe 19 toward the disk and to yieldingly press it against the surface thereof in a manner whereby any irregularities that may exist either upon the surface of the disk or in its rotation upon its bearing will not affect the operation of the toe of the boot as a coöperative element of the furrow opening mechanism.

The shank 15 is provided with a grain deflecting trough 23 upon its inner surface that registers at its upper end with the rear half of the conduit in the upper part of the boot, and extending downward is inclined forward in a manner to operate as a deflector for the grain and direct it toward the forward portion of the curved conduit in the lower part of the boot in its path to the furrow.

For the purpose of retaining the two members of the boot in assembled relation I provide an eye member 24 having a screw threaded shank portion that passes through a horizontally arranged slot in the rear wall of the lower member of the boot and engages with a threaded hole in the shank 15, permitting the lower member of the boot to have a limited rotative movement upon its axis in either direction.

What I claim as my invention, and desire to secure by Letters Patent, is:

1. A disk furrow opener for grain drills including, in combination, a rotatable disk, a grain conduit adapted to conduct the grain into the furrow opened by said disk, said conduit including upper and lower members, said lower member having a forwardly projecting toe member adapted to contact with the side of said seed disk near its periphery, said lower member being adapted to turn about said upper member the axis thereof being substantially vertical whereby said toe is permitted to move toward or from said disk.

2. A disk furrow opener for grain drills including, in combination, a rotatable disk, a grain conduit adapted to conduct the grain into the furrow opened by said disk, said conduit including upper and lower members, said lower member having a forwardly projecting toe member adapted to contact with the side of said seed disk near its periphery, said lower member being adapted to turn about said upper member the axis thereof being substantially vertical whereby said toe is permitted to move toward or from said disk, and a spring connected with the two members of the conduit and operative to turn the lower member in a manner to yieldingly press said toe against said disk.

3. A disk furrow opener for grain drills including, in combination, a rotatable disk, a grain conduit adapted to conduct the grain into the furrow opened by said disk, said conduit including upper and lower members, said upper member having a bearing upon its lower end, said lower member being journaled upon said bearing, and a spring encircling said bearing and operative to yieldingly turn said lower member in one direction upon its axis.

4. A disk furrow opener for grain drills including, in combination, a rotatable disk, a grain conduit adapted to conduct the grain into the furrow opened by said disk, said conduit including upper and lower members, said lower member having a socket at its upper end, said upper member having a reduced portion received by said socket, a spring received by said socket and encircling said bearing, said spring having oppositely disposed tangs at opposite ends thereof, one of said tangs engaging with the upper member of said conduit and the other with the lower member thereof whereby said lower member is yieldingly turned about its axis in one direction.

5. A disk furrow opener for grain drills including, in combination, a rotatable disk, a grain conduit adapted to conduct the grain into the furrow opened by said disk, said conduit including upper and lower members, said lower member having a socket at its upper end and its lower end curved downward and forward, said upper member having a bearing received by said socket and upon which said lower member may turn, and an extension bearing, said bearing projecting within said lower member at its rear side and operative as a deflector for the grain as it flows therethrough.

6. A disk furrow opener for grain drills including, in combination, a rotatable disk, a grain conduit adapted to conduct the grain into the furrow opened by said disk, said conduit including upper and lower members, the lower member being turnable upon said upper member upon a longitudinal axis and having its lower end curving downward and forward, said upper member having an extension at its lower end projecting within said lower member at its rear side, said lower member having a horizontally arranged slot within its rear wall and a holding screw received by said slot and secured to said extension of said upper member and operative to hold said members in assembled relation.

7. A disk furrow opener for grain drills including, in combination, a rotatable disk, a grain conduit adapted to conduct the grain into the furrow opened by said disk, said conduit including upper and lower members, the lower member being turnable upon said upper member upon a longitudinal axis and having its lower end curving downward and forward, said upper member having an extension at its lower end projecting within the upper end of the lower member at its rear side and having a trough upon its forward face that inclines downward and forward in a manner to operate as a deflector for the grain as it flows toward the furrow.

DUNY A. SCHUTT.

Witnesses:
W. J. KLOCKZIEN,
A. N. TEUFEL.

Copies of this patent may be obtained for five cents each, by addressing the "Commissioner of Patents, Washington, D. C."